United States Patent [19]

Davidson et al.

[11] Patent Number: 4,893,234
[45] Date of Patent: Jan. 9, 1990

[54] MULTI-PROCESSOR INCLUDING DATA FLOW ACCELERATOR MODULE

[75] Inventors: George S. Davidson; Paul E. Pierce, both of Albuquerque, N. Mex.

[73] Assignee: United States Department of Energy, Washington, D.C.

[21] Appl. No.: 3,540

[22] Filed: Jan. 15, 1987

[51] Int. Cl.⁴ .............................................. G06F 13/00
[52] U.S. Cl. ............................... 364/200; 364/232.22; 364/254.5; 364/230.3
[58] Field of Search ..................... 364/200 ms, 900 ms

[56] References Cited

U.S. PATENT DOCUMENTS

| | | | |
|---|---|---|---|
| 3,978,452 | 8/1976 | Barton et al. | 364/200 |
| 4,145,733 | 3/1979 | Misunas et al. | 364/200 |
| 4,153,932 | 5/1979 | Dennis et al. | 364/200 |
| 4,591,979 | 5/1986 | Iwashita | 364/200 |
| 4,757,466 | 7/1988 | Miyaoka et al. | 364/736 |
| 4,814,978 | 3/1989 | Dennis | 364/200 |

OTHER PUBLICATIONS

Requa, James et al., "The Piecewise Data Flow Architecture Architectural Concepts", IEEE Transactions on Computers, vol. 32, No. 5, May 1983, pp. 425–438.
A. Plas et al. "LÅU System Architecture: A Parallel Data-Driven Processor Based on a Single Assignment," Proc. 1976 International Conference on Parallel Processing, pp. 293–302.
K. Hwang, "Multi-Processor Supercomputers for Scientific/Engineering Applications", Computer, June 1985, pp. 57–73.

Primary Examiner—Thomas M. Heckler
Assistant Examiner—Jonathan C. Fairbanks
Attorney, Agent, or Firm—George H. Libman; James H. Chafin; William R. Moser

[57] ABSTRACT

An accelerator module for a data flow computer includes an intelligent memory. The module is added to a multiprocessor arrangement and uses a shared tagged memory architecture in the data flow computer. The intelligent memory module assigns locations for holding data values in correspondence with arcs leading to a node in a data dependency graph. Each primitive computation is associated with a corresponding memory cell, including a number of slots for operands needed to execute a primitive computation, a primitive identifying pointer, and linking slots for distributing the result of the cell computation to other cells requiring that result as an operand. Circuitry is provided for utilizing tag bits to determine automatically when all operands required by a processor are available and for scheduling the primitive for execution in a queue. Each memory cell of the module may be associated with any of the primitives, and the particular primitive to be executed by the processor associated with the cell is identified by providing an index, such as the cell number for the primitive, to the primitive lookup table of starting addresses. The module thus serves to perform functions previously performed by a number of sections of data flow architectures and coexists with conventional shared memory therein. A multiprocessing system including the module operates in a hybrid mode, wherein the same processing modules are used to perform some processing in a sequential mode, under immediate control of an operating system, while performing other processing in a data flow mode.

11 Claims, 5 Drawing Sheets

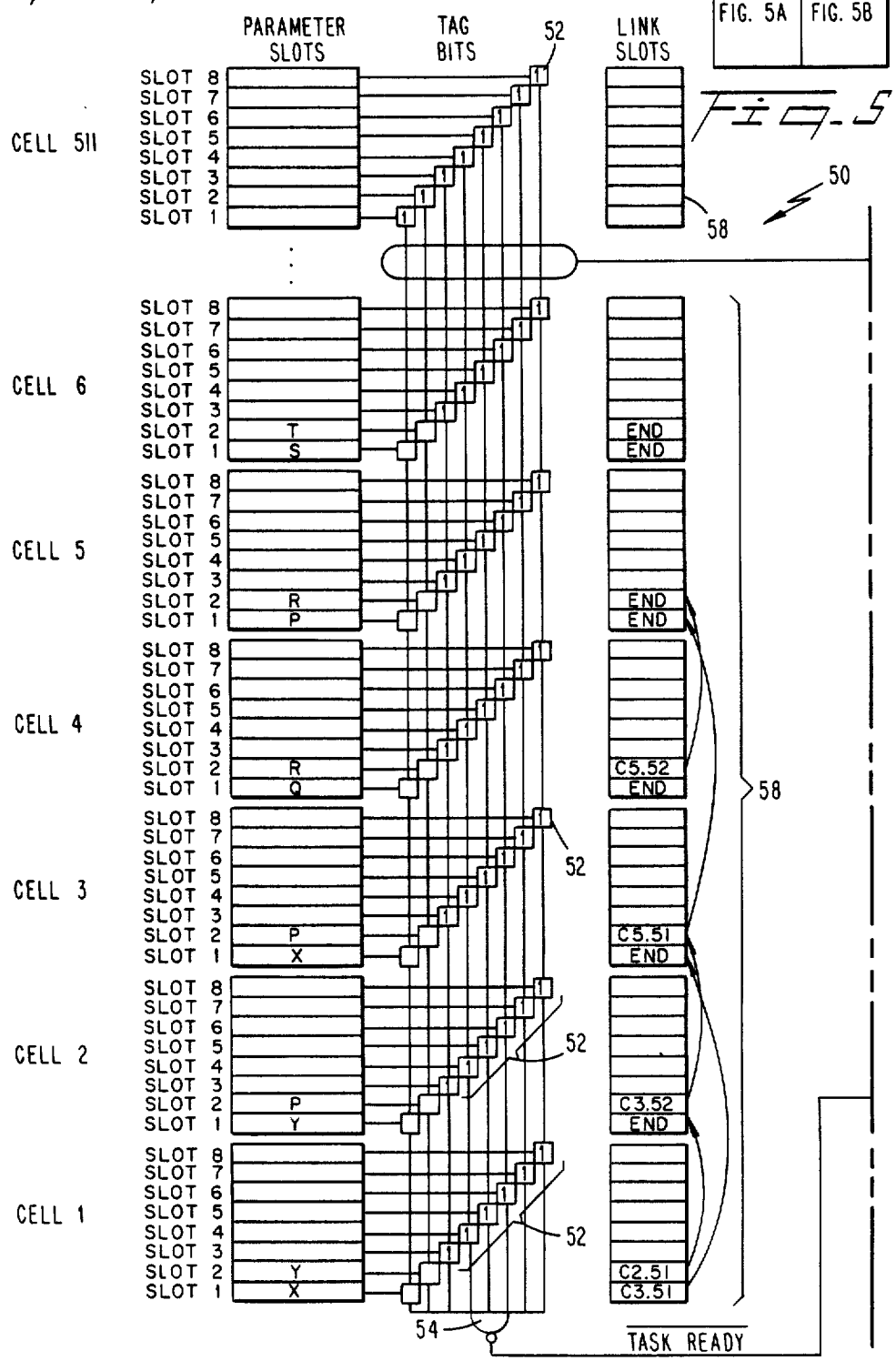

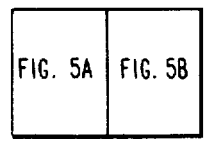
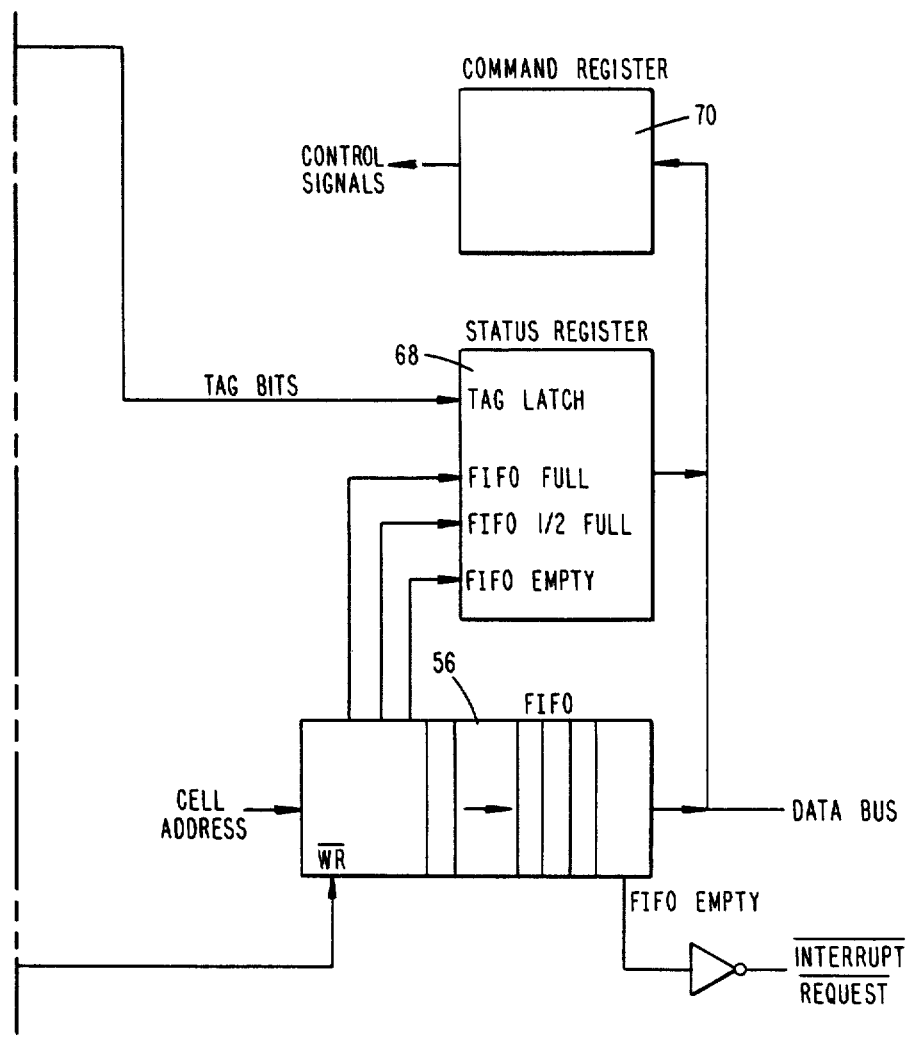

MULTI-PROCESSOR INCLUDING DATA FLOW ACCELERATOR MODULE

The U.S. Government has rights in this invention pursuant to Contract DE-AC04-76DP00789 between the Department of Energy and AT&T Technologies, Inc.

TECHNICAL FIELD

This invention relates to a multiprocessing data flow computer arrangement including multiple parallel processors, and more particularly to a tagged architecture memory module used to accelerate execution of parallel algorithms and to schedule a computation automatically, as soon as data for the computation arrives, thereby reducing communication and synchronization overheads and accelerating execution of parallel algorithms using small grain computations.

BACKGROUND ART

The use of parallel processors to increase the rate of computation is known in the art. Associated with such parallel structures is a high overhead requirement for communication and synchronization, as well as overhead expenses associated with inefficient use of processing units, such as by underutilization of the processing capability thereof.

More specifically, to increase throughput and computing speed, a plurality of processors are used in a parallel arrangement, known as a data flow architecture, in which a number of substantially identical modules are assigned to a solution of a particular problem.

Such a parallel processing architecture may be used when the problem being solved may be decomposed into a number of subproblems, each of which may be processed by one of the modules.

Illustratively, a data dependency graph, or data flow graph, is shown in FIG. 1. The graph illustrates a decomposition of a program for solving a complex problem by performing a number of simpler individual subprograms or tasks, shown at individual nodes of the graph. Arcs are shown to illustrate the flow of data among the nodes, and thus to identify the dependency of the subprogram performed at one node on the results of computations performed at other nodes.

In the flow graph of FIG. 1, input data is provided as X and Y, for example. Nodes 1-6 represent various computations which rely on the input data and on intermediate results determined by other nodes. All parameters, intermediate results, or input data necessary to perform the computation at a node are illustrated by incident arcs flowing into that node. The result of the computation at the node is sent by an arc originating at the node and incident on other nodes requiring that result.

A computation at a node begins as soon as al data required for the computation is present on the arcs incident on the node. In such a decomposition of a larger program into a sequence of tasks of reduced "grain" size, the progression of computations is seen to depend only on the flow of data. This dependence leads to the name "data flow computation" for the technique.

Prior implementations of data flow computational architectures are known, in which the topology of a data flow graph, representing a sequential program to be performed, is reflected by the architectural arrangement of the modules. For example, each node of the flow graph, representing an operation, is implemented by a template defined by a sequence of macro instructions. Such templates are shown in FIG. 2, arranged to perform a computation illustrated by the data flow graph of FIG. 1. As seen from FIG. 2, each template contains an operation identifier 8, slots 9 for one or more operands to be filled by data tokens as they arrive, and links 11 to other templates which are awaiting the result of the computation of the present template.

FIG. 3 shows a block diagram of a known data flow computer 10 for executing templates. Therein, a dispatcher 12 passes ready templates 14, having all required data, to an available processing module 16. When the computation is complete the template, along with its result, is passed to a matcher 18, which sends the results of the computation to all templates needing the result, as indicated by the link fields in the template. Those templates which are partially ready, i.e., those which have not yet completed the assigned computation, are kept in a storage section 20 for incomplete templates.

The matcher 18 matches newly available results, or operands, with the incomplete templates. If a particular operand is the last required by an incomplete template, the template is passed on to the dispatcher 12. The illustration of FIG. 3 describes the flow of the templates with their operands to the individual processors. From FIG. 3 the importance of the matcher is apparent. Such a unit is required to be quite fast in operation to keep from delaying computations, since any delay s multiplied by subsequent delays repeatedly introduced thereby. Moreover, it is also apparent that the storage of the matcher is required to be sufficiently large to hold all the partial, or incomplete, templates. These requirements tend to increase the expense associated with data flow computers.

A typical data flow computer as shown in FIG. 3 requires an assignment of the specific templates to particular ones of the processors. In one approach, the dispatcher is made explicitly aware of which of the processors are not busy.

In an alternative approach illustrated by the EMSP computer of AT&T, described below, a transfer circuit is provided for passing the templates along a distribution bus which is accessed by each of the processors. In this approach, an idle processor plucks the template from the bus and executes the indicated operation or subprogram. Any template passing through all the processors without being picked up for computation must be passed again along the bus.

From the foregoing, it is seen that the data flow computers of the prior art require that sufficient capacity be provided in the distribution circuit and the distribution bus for simultaneously holding all the ready templates. Alternatively, sufficient storage must be provided for the templates and the results.

In one known implementation of a data flow computer, an iterative array is formed of signal processing chips of the type identified as uPD7281, provided by NEC. Each chip includes input and output controllers, connected by a bus and by a circular pipeline including: a link table for storing instruction parameters; a function table for instruction parameters; a data memory for constants or temporary data; FIFO data and generator queues; a processing unit for executing logical, arithmetic, and bit operations; and an address generator and flow controller for generating addresses for the data memory and for controlling the flow of tokens. A refresh controller generates refresh tokens for internal DRAMs and is connected to the input controller, and an output queue receives the output tokens from the data and generator queue and provides the same to the output controller. The array is arranged to form a large pipeline, wherein the output of one chip is provided as the input to the next.

In another architecture, known as the AT&T Technologies Enhanced Modular Signal Processor (EMSP) computer, a command program processor, an input/output processor and a number of arithmetic processors are connected to receive data from one data transfer network and to provide the results to a second data transfer network. The command program processor is in communication with displays and a separate tactical computer. The input/output processor receives sensor data and provides outputs to post processing displays, and the like. A scheduler and a number of global memory units receive data from the second data transfer network and provide operands to the first transfer network and further provide information to the command program processor.

In operation, data arrives from external sources and is stored in global memory queues. When a queue is full, the data transfer network, which is a cross bar switch, connects the queue to a free processing element. A primitive operation identifier and the address of the queue are given to that processor. In this system, the microcode for the primitives is resident in each of the processors in the system. The primitives are large scale computations found in signal processing, such as an n-point fast Fourier transform (FFT). The architecture of the EMSP is characterized by the three features of data accumulating queues, use of the cross bar switch rather than a circulating bus, and the storage of the microprograms for all of the primitives in each of the processors.

Still another data flow computer is known as the Manchester data flow computer, which is similar to the description of the general device of the prior art as previously described with reference to FIG. 3. This computer is a heavily microcoded computer, with extensive matching circuitry. Performance thereof is reportedly comparable to a VAX 11/750 computer.

The structure includes an I/O switch in communication with the host and providing token packets to a token queue. From the queue, packets are provided to a matching unit which is paralleled by an overflow unit. An instruction store receives token-pair packets from the matching unit and provides executable packets to a processing unit which, in turn, provides token packets to the I/O switch.

Still another data flow computer, known as the MIT static Data Flow computer, is similar to the structure of FIG. 3 in many respects. However, an explicit control network is provided to provide control packets to the memory having the various instruction cells therein. An arbitration network receives the appropriate instructions from the cells. The arbitration network provides decision units to the control network and operation units to a distribution network for distribution to the memory cells.

A French LAU computer uses tag bits C0, C1, C2 and Cd to record when an instruction is ready for execution. The instructions are typically single operators. The LAU computer has microcoded processors built from AMD-2900 bit slice components. However, the tags are deeply connected to the micro-instructions. The tag bits, which are directly set and cleared by the microcode processors rather than being the side effect of a memory access, thus require considerable communication overhead. The LAU multiprocessor includes a group of elementary execution processors which are updated, read from and written into by external control units for instructions and data. A subsystem memory reads and writes operands from and to the processors, and provides instructions thereto. The control units and subsystem memory communicate the readiness of the instructions, and further communication with an interface which is in communication with the host minicomputer.

As will be appreciated from the foregoing descriptions, the known data flow computers are typically extensions of processor technology, and use message passing techniques to communicate the templates and operands among the various sections thereof. It is thus a drawback of the prior art that significant storage and data handling capacity is required.

In view of the previously described prior art devices, it should be appreciated that, to increase utilization of the computing capacity of the system, and thus to reduce the computing overhead associated therewith, the size and complexity of the subprograms tó be executed by the various computational modules should be made smaller. If the subproblems or tasks to be solved by the individual processors are of large size, or granularity, a requirement that each of the plural processors must be capable of performing the largest task size results in significant underutilization of the processing capabilities of some of the modules.

The degree of underutilization is increased by the large grain size of the subproblems, since a potential variation of 10% or 20% in complexity of the large subproblems results in requirement for each of the modules to have processing capability which is 10% to 20% larger than a base average capability, which is itself large. On the other hand, in a reduced grain size arrangement the average processing capability is reduced, uniformity in processing requirement is increased, and the variation from the average requirement is also reduced.

Thus, by reducing the grain size of the programs or tasks to be performed by each module, a more efficient use can be had of the parallel processing facilities, with reduced underutilization. Accordingly, with a higher degree of utilization of computing facilities fewer processors may be used, so that a less expensive system results. However, historically such attempts at smaller grain computations have led to larger costs in communication and synchronization.

There is thus a need in the prior art to provide more efficient use of parallel processors, by reducing the grain size of the programs or tasks, while simultaneously reducing the communication and synchronization costs associated therewith.

DISCLOSURE OF INVENTION

It is accordingly an object of the present invention to overcome the difficulties encountered in the above descriptions of prior art data flow computers, and to provide a simpler and more efficient architectural implementation of a data flow computer.

It is a more particular object of the invention to provide a memory technology for enabling a data flow computer to implement a data flow graph.

It is a more specific object to overcome prior art requirements both for storage to be available for an unknown number of partially ready templates, or instructions, and for execution of a large number of cycles in order to determine which templates have become ready following computation of each new result.

Still another object of the invention is to provide automatic scheduling of a computation as soon as the data required thereby arrives.

It is yet another object of the invention to provide a memory implementing exactly the functions of arcs incident on a node in a data dependency graph, to store data tokens until needed and to fill all arcs with data values thereby scheduling computation in the node.

Yet another object of the invention is the provision of a memory structure in which means is provided for detecting when all memory locations provided to hold data for a computation are filled, and for automatically scheduling the computation as a result of the detection.

In accordance with these and other objects of the invention, there is provided an improved computer arrangement for implementing a data flow graph, including therein a plurality of processors each for executing a primitive computation of a node of a data flow graph. The improved structure provides an accelerator module, for accelerating execution of the computation without requiring additional communication and synchronization devices. Particularly, the accelerator according to the invention includes a memory structure in which memory cells represent nodes of the graph, each cell including a plurality of slots for storing data operands. Additionally, an identifying structure is provided for identifying a respective primitive to be used on the operands, and an indicating structure provides indication whether all operands required by the primitive are available.

Preferably, the indicating structure includes a tag bit generator for generating tag bits for each slot of the cell. One logic value is assigned to a tag bit each time a processor writes a parameter in the slot, and a second logic value is assigned whenever a processor reads data from the slot.

In accordance with one aspect of the invention, the identifying structure may include a slot of each memory cell for storing a code to identify a primitive operation for execution by the processor corresponding to the cell.

Preferably, storage is provided for each of the primitives and a lookup table indexed by the cell number is used to store a start address for programming code implementing the primitive to be executed.

Moreover, each of the processors includes its own local storage for storing each of the primitives executable by the parallel processing system, with specific primitives identified by the starting addresses for the respective codes thereof.

Other objects, features and advantages of the present invention will become readily apparent to those skilled in the art from the following description wherein there is shown and described a preferred embodiment of the invention, simply by way of illustration and not of limitation of one of the best modes (and alternative embodiments) suited to carry out the invention. As will be realized upon examination of the specification and from practice of the same, the present invention is capable of still other, different, embodiments and its several details are capable of modifications in various obvious aspects, all without departing from the invention. Accordingly, the drawings and the descriptions provided herein are to be regarded as illustrative in nature and not as restrictive of the invention

BRIEF DESCRIPTION OF THE DRAWINGS

FIG. 5 including FIGS. 5a and 5b is a functional block diagram of a data flow accelerator module in accordance with the present invention and arranged for executing the program illustrated in FIG. 1.

PREFERRED EMBODIMENT FOR CARRYING OUT THE INVENTION

Figure 4:
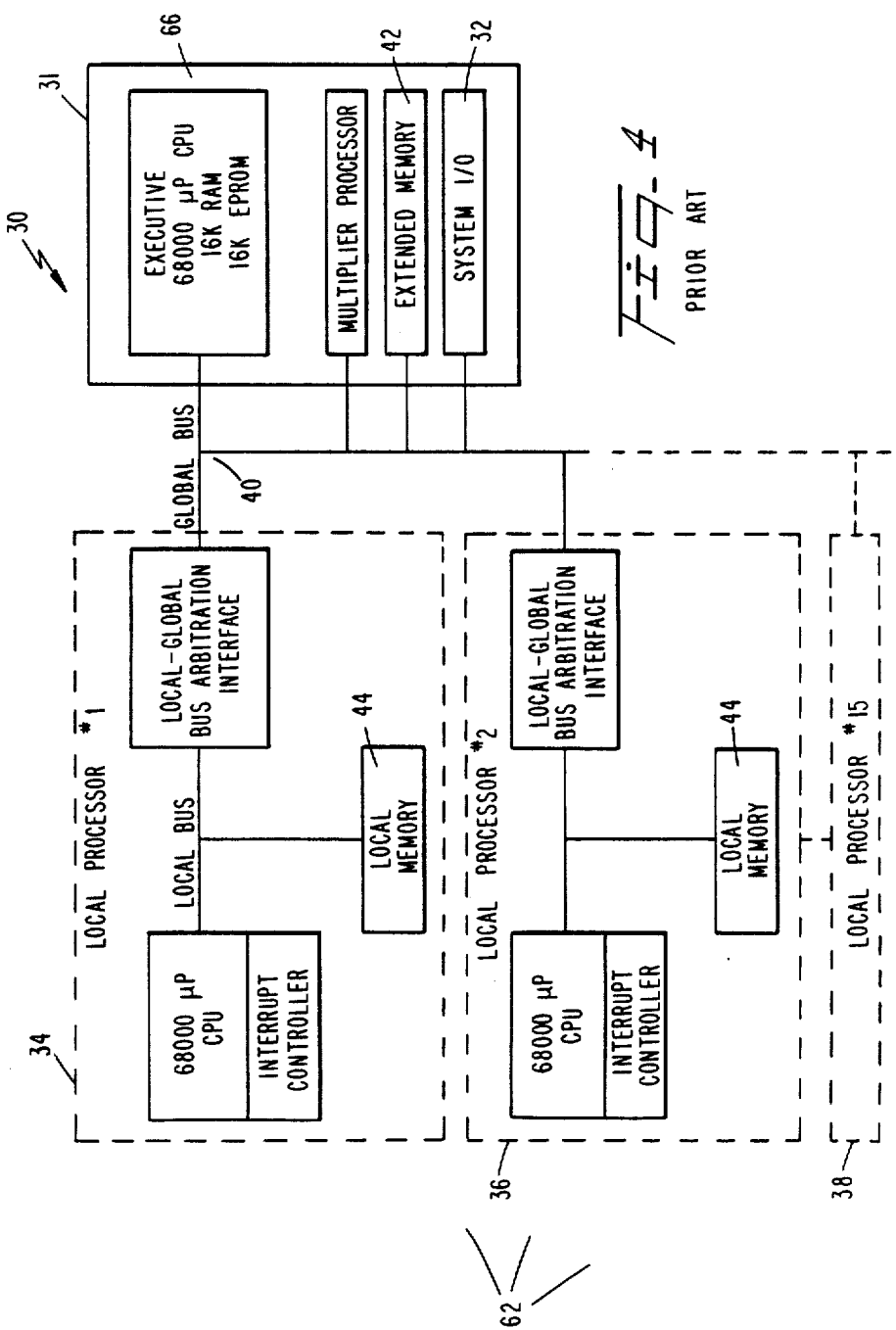
FIG. 4 is a block diagram of a specific multiprocessor architecture suitable for use with the data flow accelerator described herein.

Referring now to the multiprocessor architecture shown in FIG. 4, there is illustrated a computer 30, identified as the SANDAC-IV computer. The illustrated computer includes an input/output processor 31 having an I/O system 32, and a plurality of additional processors 34, 36, . . . ,38. In a preferred embodiment, as many as 15 additional processors may be used, each of which includes a Motorola 68000 microprocessor.

The system is built around a global bus 40, and includes various global resources, such as a global memory 42. Each of the 15 processors includes its own local memory 44, and has access to the global memory 42.

Because the architecture of FIG. 4 can not pass templates efficiently from processor to processor, the present invention, illustrated in the diagram of FIG. 5, was developed to avoid the need to pass the templates from one processor to another.

Figure 1:
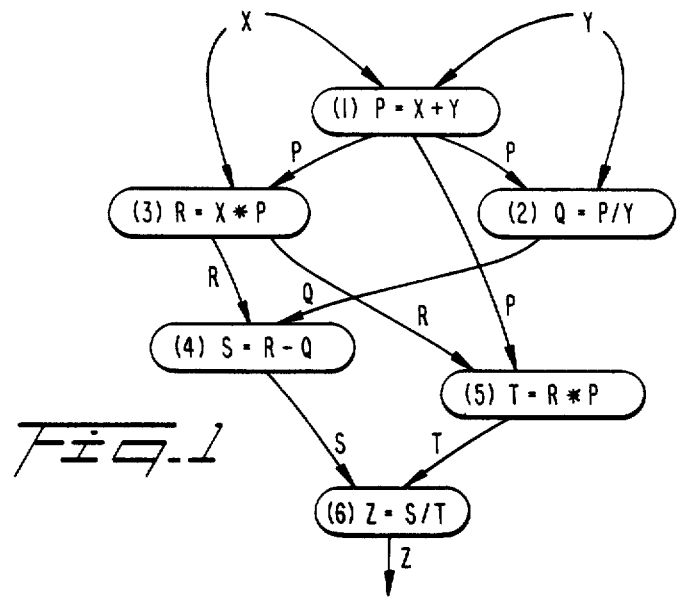
FIG. 1 is a data dependency graph of a sequential program illustrative of decomposition of a program to subprograms for a data flow computer.
Figure 2:
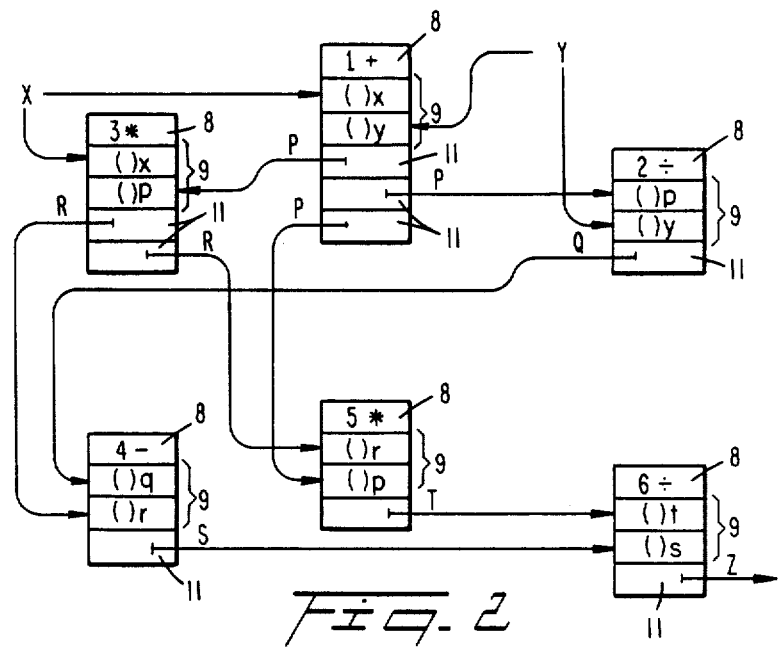
FIG. 2 shows an architectural representation of a data flow computer for executing the program illustrated in FIG. 1.
Figure 3:
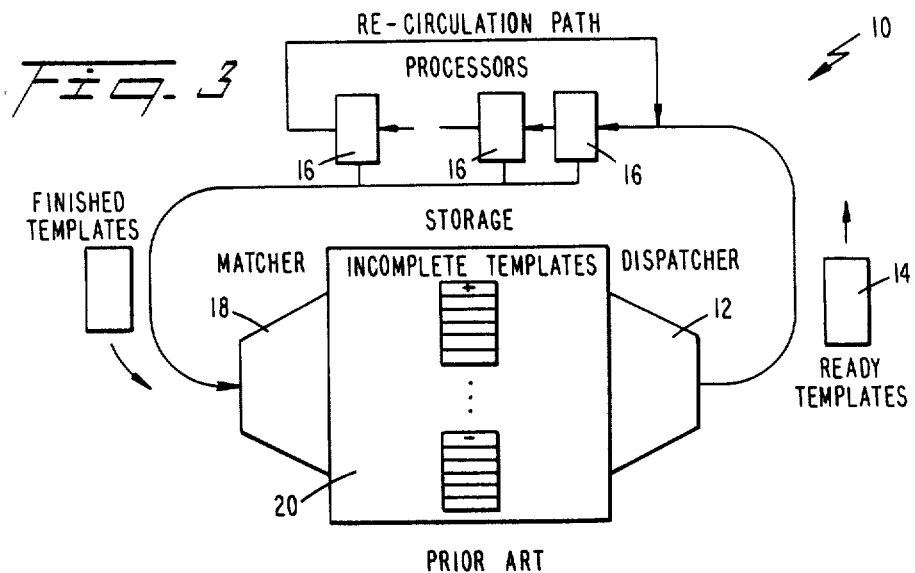
FIG. 3 is a general block diagram of a typical data flow computer architecture for executing templates.

The arrangement of FIG. 5 shows a Data Flow Accelerator Module (DFAM) for the SANDAC-IV computer of FIG. 4, as arranged to perform the operations of the data flow graph of FIG. 1. As seen in FIG. 5, the DFAM architecture provides division of a memory 50 into a plurality of cells shown as cell 1, cell 2, . . . , cell 511. In one embodiment of the invention, these cells are 32K by 8 bit static CMOS RAM. The cells represent nodes of the data dependency graph, and each cell includes a number of parameter slots representing one operand taken from an arc incident on the node in the graph. A computational primitive, i.e., a small grain of program code which uses the data values in the slots to compute the node results, is respectively associated with each of the cells. As described below, identical copies of each of the primitives are provided for each processor participating in execution of the data flow, with one particular primitive being associated with each particular cell.

A one-to-one relationship is provided between the cell number (hence the graph node) and a specific primitive identifier code. Thus, a cell and a microprocessor are associated with a particular primitive when that node is enabled. In other words, a processor only becomes associated with a primitive when that processor reads the cell number of an enabled node. Moreover, by passing the cell number (or primitive identifier code) to an available processor as an index for a table containing the actual start address of that processor's local copy of the primitive, the cell number can be used to determine the primitive to be executed.

Advantageously, by simple reassignment of starting addresses to the primitive identification slots of the cells, the inventive arrangement is thus easily reconfigured to provide execution of different subprograms.

In another aspect of the invention, each of the slots of the cells is provided with a tag bit storage location 52. The tag bits may be stored in registers provided for each of the cells or in other storage facilities provided therefor, such as 4K by 1 bit RAM. The tag bit for a particular slot is set when any processor writes data into that slot and is cleared when some processor reads the data from the slot. At the end of a memory cycle, all tag bits for the cell containing the accessed slot are tested. If all tags are set to a 1 value, each slot in the cell has been written into, so that all operands for the associated primitive are available.

The inventive architecture includes a NAND gate 54, connected to the storage devices 52 for the tag bits. Upon determining that all bits of a cell are at the logic level 1, a Task Ready signal is generated by the NAND gate 54 and is input to a FIFO (first-in-first-out) holding queue 56. A 512×9 bit FIFO such as an IDT 7201 has been used for FIFO 56. Upon receipt of the Task Ready signal, FIFO 56 accepts the cell address which, as described above, is identified with a particular primitive to be executed. Accordingly, a holding queue is established by the inventive structure for scheduling execution of primitives in the order that the operand sets thereof are completed.

During a computation, when any processor completes its current activity, the processor reads the next ready cell address from FIFO 56. A non zero address identifies the primitive associated with the memory cell containing the data to be processed corresponding to a node in FIG. 1. By using the cell number as the index, the processor executes an indirect jump to the code for the newly assigned primitive. Thus, the inventive memory structure uses a very low overhead for task distribution, requiring only a global read operation and an indirect, indexed branch to the primitive code.

A zero value of cell address in the FIFO is used as an indication that no primitive is ready for execution. A processor reading zero value enables the interrupt for that processor. When the FIFO is no longer empty, an interrupt is generated to all processors. Those processors which are performing an operation will not respond to the interrupt. However, those processors which has been stopped, and which have been enabled to receive the interrupt, will be awakened thereby. The interrupted processor will try to access the FIFO. If the processor reads a non-zero value, the primitive code is accessed as described above. If the attempted read operation again results in a zero value, indicative of an earlier read of the FIFO by another processor, the present processor is again stopped, with its interrupt re-enabled. Of course, the processor may be performing other tasks unrelated to this invention while awaiting an interrupt from the DFAM.

In accordance with the invention, the memory cells of the accelerator module further include link slots 58, which slots may preferably be formed of 32K by 8 bit RAM, which identify any cells to which the result "P" of the primitive executed by the processor associated with memory cell 1 is needed to execute the primitives assigned to cells 2, 3 and 5, the appropriate link slots of the cell are provided with a chain of pointers to other target addresses identifying both the target cells and target slots therein for transfer of the computed result.

An advantage of the present structure is the reduction in the overhead associated with fetching and executing instructions, and the movement of results from one node to another. In the data flow graph of FIG. 1, cell number 1 sends the result "P" computed thereby to three subsequent nodes. To accomplish the transfers, the processor associated with node 1 must compute the parameter "P" and thereafter execute three "move" instructions. In more complicated problems, copies of the result may require transfer to significantly larger numbers of locations, requiring a substantial overhead in the number of "move" instructions to be processed.

In the architecture of FIG. 5, however, wherein link slots 58 are provided for each data slot, the above described overhead is eliminated. When a processor writes a value to an operand or parameter slot the active memory sets the associated tag bit and fetches an associated link pointer. If the pointer is at an end value, selected to be any negative number, no further action is taken. However, if the pointer is at another value, the pointer value is taken to be the address of another data slot to be updated with the value just written by the processor. The active memory of the invention continues such linking until the value is stored in a slot having a link pointer of −1.

It will be appreciated from the foregoing description that the above described operations occur as fast as the memories can respond, without requiring any further intervention by the processor. The link slots themselves are initialized at program load time. The memory cells needing the various results are known at compile time. Accordingly, it is an easy matter to generate constant tables to fill these link slots. Advantageously, while the main memory of the invention is distributing the value to all locations in which it must be written, no processor can access memory on the main board of the accelerator module. Thus, there is no need to disable or otherwise hold off accesses to the memory not located on the main board of the inventive accelerator module while the links are being followed.

The above described architecture should be expanded if some of the primitives are so large that the code description thereof is stored in only a limited number of processors. The extension preferably has a special FIFO for each of the plural processors, so that when a processor reads a primitive number from the DFAM FIFO, which primitive number is not supported by the processor, a stub for the primitive is executed instead.

The stub preferably simply puts the primitive number into the special FIFO for the processor which does have the real code for this primitive. Additionally, the stub must also be selected to cause an interrupt to the processor while still able to execute the primitive.

When using the above described approach, it is apparent from FIGS. 1-5 that each processor must first check its own special FIFO for functions which it, alone, can perform before reading the DFAM FIFO for more generalized functions.

It is known that the computational throughput of a data flow computer is proportional to the number of available processor modules to be applied. Thus, data flow computers are potentially fault tolerant, since performance of the system suffers only a graceful degradation as processors fail. Accordingly, to provide support for such an operation each processor periodically runs a self diagnostic prior to reading the data flow FIFO. If any faults are found, the processor shuts off and discontinues participation in data flow computations. Preferably, the diagnostics are scheduled on individual ones of the processors so that other processors are able to continue data flow computations while the off-line processor runs its self-diagnostics. In one embodiment of the invention, the diagnostics are scheduled to occur whenever a special interrupt is generated for the processor.

Figure 6:
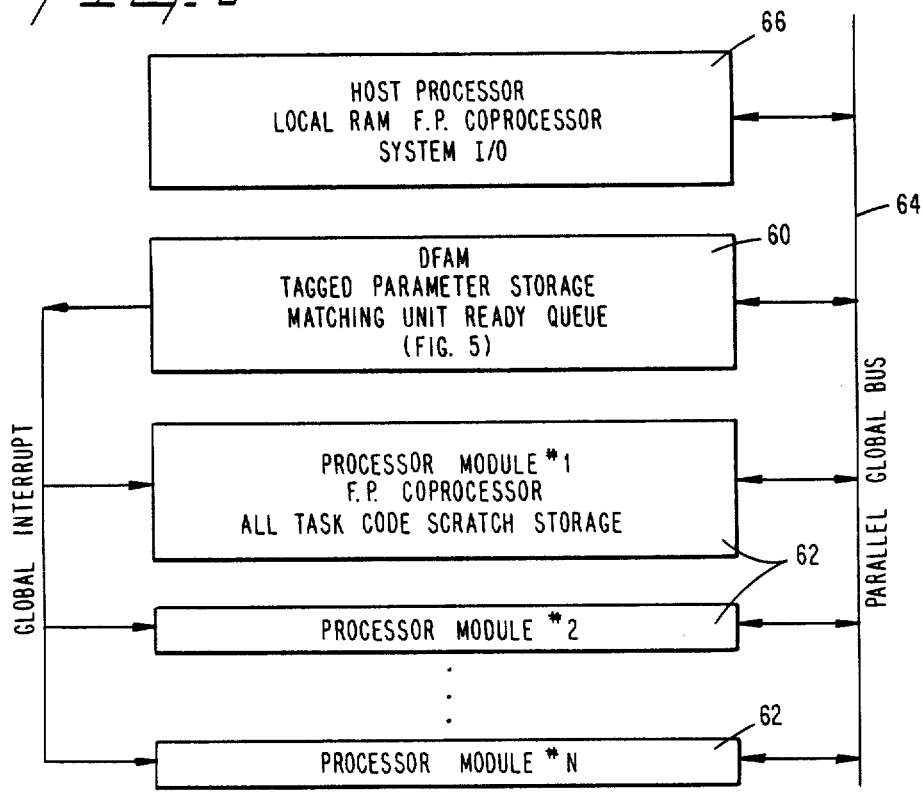
FIG. 6 shows a parallel processor architecture including the accelerator module of the invention.

Operation of a parallel processor with the inventive DFAM is illustrated by FIG. 6, showing a system level view of a multiprocessor with a shared global bus and the inventive DFAM in place.

As seen in the Figure, the data flow accelerator module 60 is accessed by one or more processor modules 62 via a conventional bus 64, similarly to access of any random access memory. The DFAM 60 is, indeed, intended to be part of the common memory of a shared memory computer wherein a plurality of processor modules 62 have access to global memory resources. A hardware arbitration scheme allocates the global bus 64 to only one of the processor modules 62 at any one time. As noted on the drawing, each of the processor modules includes a local memory which stores the code for each of the primitive tasks to be assigned thereto for execution. Moreover, as previously described, each processor further includes an interrupt response capability.

Use of the local memory of the processor modules for storage of the primitive codes advantageously minimizes the bandwidth requirements for the global bus, since processors only access the global bus for data transfers. However, if local memory is unavailable, or in short supply, or if lower performance levels are acceptable, the primitive codes could be executed from the global bus 64.

As previously noted with reference to FIG. 5, The random access memory of the accelerator module of the invention is partitioned to a plurality of cells, which are small groups of associated addresses, or parameter slots. The cells and the slots thereof are associated with a primitive, task, or module of program statements, represented by a node of the data flow graph. The slots represent the parameters required by the task on a one-to-one relationship. The slots in the preferred embodiment are each 32 bits long. Although the embodiment of FIG. 5 shows all cells as having the same number of slots, it is possible that the number of slots may vary among the cells and that the length of the slots may not be a constant.

Each slot is associated with a tag bit storage location 52, which is set to a "1" level when data is written in the slot. The tag bit is reset to "0" when the slot is read. The tab bit is preferably stored in a separate one-bit memory location, at the same address of a tag memory as the address of the parameter slot in the memory cell.

As shown in FIG. 5, the array of tag bit cells may be conceived as having a number of columns equal to the number of slots in a memory cell, and a number of rows equal to the number of cells in the module. When any slot of a particular cell is accessed, all of the tag bits in the tag bit row addressed by the task cell are accessed. During the first part of the access cycle to a parameter slot, the tag bit in the column addressed by that slot address is set to a "1" for a write operation or to a "0" for a read operation. Thereafter, all of the tag bits for the cell including the accessed slot are checked by the multiple input NAND gate 54. If all bits are set to "1", the inverted output of the NAND gate will be "true", to provide a "Task Ready" signal for the FIFO 56 which, responsively thereto, stores the cell address of the cell in the "Cell Ready" queue therein.

When a processor module reads the FIFO by the parallel global bus 62, a "FIFO Empty" condition is no longer detected and generated by a status register 68 of the DFAM, which may be formed of 54HC245 and 54HC374 registers. Accordingly, an interrupt request is presented to all processor modules. Only an idle processor module, or one executing a lower priority operation, is interrupted by the interrupt request. Each of the interrupted processor modules responds by attempting to read a Task Cell number from the Cell Ready queue in the FIFO 56. Since a direct relationship is established between the cell number and the beginning address of the associated primitive in the processor's local memory space, only a simple calculation is required for the responding processor to compute the actual address of the code from the cell number obtained from FIFO 56. For processor modules utilizing microprocessors having a capability for indirect jumping through a memory location with an offset, the memory location is the base address of a table containing the entry point to each individual task and the offset is the accessed FIFO contents.

The status (control) register 68 of the accelerator module is primarily a debugging tool, which indicates the status of the FIFO, as well as the results of the most current tag bit field. Conditions indicated by the status register are Cell Ready FIFO Empty, Cell Ready FIFO Half-Full, Cell Ready FIFO Full, the current state of bits LSB+4 (4th bit from the least significant bit) through LSB+7 of a command register 70 (a 54HC175 in one embodiment), and the latest set of tag bits referenced.

When more processors try to read the FIFO than the number of tasks queued therein, those processors reading the FIFO after depletion of available tasks again read a "0", or "queue empty" signal. Accordingly, the processor modules are programmed to respond to the empty signal, when in the "stopped with interrupt enabled" state, by returning to the previous state.

A "0" return by the FIFO is accomplished by turning off or tri-stating the output of the FIFO during the processor access and by pulling the local DFAM data bus to ground with 5K resistors when "FIFO Empty" is true. When a processor module finishes a task, the last function performed is "jump indirect through the FIFO with an offset". This is done to test for another available task and is usually more efficient than servicing an interrupt request. If no further tasks are available, the processor executes an "idle task", which enables the "FIFO-NOT-EMPTY" interrupt for itself. This sequence allows the processor to be awakened when another task is available.

An alternative and potentially more efficient approach allows the FIFO to interrupt the available processor modules and to provide an interrupt vector as part of the interrupt acknowledgement cycle. Since current bus arbitration, on available hardware, does not allow the processors to utilize global interrupt vectors, this approach must be left for future implementation.

Advantageously, however, the primary overhead associated with the alternative approach described above is related to the indirect vectoring of a processor to the primitive to be executed. The anticipated time will be 6 to 8 microseconds for a 68000 microprocessor clocking at 10 MHz with no wait-states and less than 3 microseconds for a 68020 microprocessor clocking at 16 MHz with no wait-states. Neither of the above estimates takes into account bus arbitration time, which is an uncertain factor due to processor collision on the global bus. Another form of overhead is realized due to the distribution of a single computed parameter to more than one waiting task.

This problem is solved by a hardware link pointer associated with each slot. At program compile time, each parameter having a multiple occurrence of that parameter will have a table generated which indicates the absolute slot address of every instance of that parameter. At program load time, the table is distributed in the form of a linked list in the link slots associated with the parameter slots in the DFAM. Each link slot is loaded with the address of another instance of the same parameter unless the current slot is the last instance of that parameter, in which case the link slot is loaded with a hexadecimal value FFFF, indicating an end of the link. The active link slots of the data flow graph example of FIG. 1 are shown in FIG. 5 as containing the cell and slot address of another instance of the same parameter.

Any task which generates a parameter will only write to the address of the head of the linked list, causing the hardware to replicate the data down the linked list automatically, until a FFFF link is encountered. A timing state sequencer (not shown) on the DFAM generates the control signals necessary for both modifying the tag bits and replicating data according to the contents of the link slots. It is anticipated that a hardware replication of parameters will execute at least an order of magnitude faster than possible with software replication by the processor.

It should be noted that a number of error detecting features are incorporated in the inventive accelerator module. One type of error detection is provided by causing a "Bus Error" when a parameter is written which tries to cause another primitive to be queued when the FIFO is full. Another is provided by causing a Bus Error when a parameter is written to a slot which has a current tag bit set to "1". A third is provided by causing the FIFO to return a value of "0" if a processor reads from an empty FIFO. Yet another error detection feature incorporated in the module causes a Bus Error if a processor tries to read a parameter which has a reset tag bit, indicating that no data is available for that slot. Such a condition should never occur unless a hardware or software fault occurs, since a cell value would never have been queued unless all of the parameters thereof were available.

This feature, as well as setting a Bus Error by attempting to overwrite an unconsumed parameter, supports debugging of the accelerator module. These features may be disabled by writing to the control/status register, and re-enabled by the next read of the control/status register.

For proper operation of the accelerator module in the parallel multiprocessor architecture, initialization thereof is defined as follows.

Power-up initializes to zero bits LSB+4 through LSB+7 of the command register 70, thus disabling pushing of new task cell values into the FIFO 56. Disabling the input to the FIFO may also be accomplished under software control by writing a "0" to LSB+4 of the command register 70. After completion of initialization, task scheduling can be re-enabled by writing a "1" to bit LSB+4 of register 70.

After power-up, the FIFO 56 is cleared of spurious data by writing arbitrary data to the FIFO address, which is the base address of the accelerator module. This operation causes the Reset signal to the FIFO to be pulsed to a low value, clearing the FIFO. At this point, an application may be set up in the accelerator module. All unused slots in any active cells should be written, thus initializing the corresponding tag bits to "11. The example of FIG. 5 indicates the tag bits of the unused slots as containing a "1" value. All defined slots in the active cells should either be initialized with valid data or read to clear the tag bits for the unavailable data. Preferably, all slots in any unused cells are read to prevent queuing of a nonexistent task, if an erroneous write to an unused cell should occur during program development. An alternate debugging technique may involve writing all slots of unused cells to force Bus Error exception processing on erroneous accesses.

Still further initialization, following the above described basic initialization of the inventive accelerator module, will be directed at the actual problem being solved. The link slots of active parameter slots should be written with the address of another instance of that parameter, or the "end link" value of FFFF. The link slots are aliased at the respective addresses of the associated parameter slots by writing a "1" to the link enable bit (LSB+6) of command register 70. While the link slots are accessible due to the "1" value of the link enable bit, the parameter slots are hidden from CPU access.

Setting the link enable bit to a "0" value similarly hides the link slots and enables the access of parameter slots by the processing modules. Prior to writing the startup values to trigger the first tasks to run, the FIFO scheduler must be re-enabled, by writing a "1" to bit LSB+4 of the command register, and the parameter slot access must be enabled by writing a "0" to LSB+6. The above procedure completes initialization of the accelerator module, and data flow execution is begun by writing the startup values, thereby triggering the first tasks to be executed by the described architecture.

Beneath the two above described curves is provided a third curve illustrating typical performance of prior art parallel processor schemes.

The foregoing description of the preferred embodiment of the invention has been presented for purposes of illustration and description and is not intended to be exhaustive or to limit the invention to the precise forms disclosed, since many obvious modifications and variations are possible in the light of the above teachings. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

We claim:

1. A data flow computer for implementing a data flow graph, said computer including a plurality of processing means, each operable for executing a primitive computation of a node of the graph, and accelerator means for accelerating execution of said computation, said accelerator means comprising:
- a plurality of memory cells for representing, respectively, each of the nodes of the graph, each memory cell including:
  - a plurality of slot means for storing all the data operands required for a primitive computation; and
  - indicating means for providing a first output upon conclusion of each memory cycle for indicating that all operands required by a primitive associated with the cell are available, said indicating means comprising tag bit generating means for generating respective tag bits for each slot of said cell, each said tag bit having a first logic value for a particular slot each time one of said plurality of processing means writes data in said slot and for generating a tag bit of a second logic value for said slot each time one of said processing means reads data from said slot; and
  - identifying means for storing the address of only each memory cell with an indicating means providing a first output, said address being used by any one of said processing means to identify a respective primitive operation for operating on the data operands contained within said cell.

2. A data flow computer as recited in claim 1, wherein said identifying means comprises first in, first out storage means.

3. A data flow computer as recited in claim 2, wherein said computer further includes storage means for each of the primitives executable by the processing means, and said identifying means slot is operable for storage of data identifying a start address for the primitive to be executed by the processing means associated with 4. A data flow computer as recited in claim 3, wherein said storage means for each of the primitives comprises storage associated with each of said processing means, thereby providing for each of said processing means a local copy of each of the primitives to be executed by the computer arrangement and identifying means for storage of a particular start address for a particular primitive to be respectively executed by said processing means.

5. A data flow computer as recited in claim 1 wherein said computer further includes storage means for each of the primitives executable by the processing means, and said identifying means slot is operable for storage of data identifying a start address for the primitive to be executed by the processing means associated with the memory cell.

6. A data flow computer as recited in claim 5 wherein said storage means for each of the primitives comprises storage associated with each of said processing means, thereby providing for each of said processing means a local copy of each of the primitives to be executed by the computer arrangement and identifying means for storage of a particular start address for a particular primitive to be respectively executed by said processing means.

7. A data flow computer as recited in claim 1 wherein said indicating means further comprises test means for testing tag bits of each slot of the memory cell containing an accessed slot, said test means operable, upon detecting said first logic value for each tag bit of said cell, for providing a signal indicative of availability of all operands for the primitive associated with the cell.

8. A method for parallel processing a complex data computation by dividing the complex data computation into a plurality of related nodes, each node defining a portion of the computation and including a plurality of operands and a mathematical function to be performed on the operands, all operands for at least one node containing data, whereby the computation is solved by sequentially performing each node, the result from each computation being used as operands for successive computations until the last node is computed,
said method using one or more processor modules connected in parallel to a data bus, and data flow accelerator module having a plurality of memory cells and a holding queue, and comprising:
loading the computation by:
- loading all operands for each node into a separate cell of said module, the address of said cell providing an identification for said node; and
- loading a plurality of primitives into each processor, each primitive comprising the mathematical function to be formed at one node and that node's identification;

said accelerator module automatically scheduling computations by:
- sequentially sending the identification of only each node for which all operands contain data to the holding queue;

any of said processor modules performing said computations by:
- querying said holding queue to determine the identification of the node to be processed;
- using the node identification to address the primitive in the processor and the accelerator module cell containing the data;
- performing the primitive computation; and
- passing the result to those cells which use the result as data.

9. A parallel processor for complex data computation wherein the complex data computation is divided into a plurality of related nodes, each node defining a portion of the computation and including a plurality of operands and a mathematical function to be performed on the operands, all operands for at least one node containing data, whereby the computation is solved by sequentially performing each node, the result from each computation being used as operands for successive computations until the last node is computed, said processor comprising:
- a data flow accelerator module having a plurality of memory cells and a holding queue, all operands for each node being loaded into a separate cell of said module, the address of said cell providing an identification for said node, said accelerator module including means for sequentially sending the identification of only each node for which all operands contain data to the holding queue;
- one or more processor modules connected in parallel to a data bus, each processor including a memory containing a plurality of primitives, each primitive comprising the mathematical function to be performed at one node and that node's identification, each of said processor modules including:
  - means for querying said holding queue to determine the identification of the node to be processed;

means for using the node identification to address the primitive in the processor and the accelerator module cell containing the data;

means for performing the primitive computation; and means for passing the result to those cells which use the result as data.

10. A parallel processor as recited in claim 9, wherein said means for passing the result comprises linking slot means associated with each module cell, said linking slot means including therein identification of a subsequent call requiring the result of the primitive computation as an operand.

11. A data flow computer for implementing a data flow graph, said computer including a plurality of processing means, each operable for executing a primitive computation of a node of the graph, and accelerator means for accelerating execution of said computation, said accelerator means comprising:

a plurality of memory cells for representing, respectively, each of the nodes of the graph, each memory cell including:

a plurality of memory slot means for storing all the data operands required for a primitive computation;

indicating means for providing a first output upon conclusion of each memory cycle for indicating that all operands required by a primitive associated with the cell are available; and identifying means for storing the address of only each memory cell with an indicating means providing a first output, said address being used by any one of said processing means to identify a respective primitive operation for operating on the data operands contained within said cell;

each said memory slot being further associated with one linking slot for identifying a subsequent memory slot requiring a result of the primitive operation, said accelerator distributing said result to each identified memory slot.

* * * * *